United States Patent [19]

Yano et al.

[11] Patent Number: 4,472,674
[45] Date of Patent: Sep. 18, 1984

[54] METHOD OF STATIC REACTIVE POWER COMPENSATION

[75] Inventors: Masao Yano; Hiroshi Suzuki; Setsuro Mine; Masatoshi Takeda, all of Hyogo, Japan

[73] Assignee: Mitsubishi Denki Kabushiki Kaisha, Tokyo, Japan

[21] Appl. No.: 409,789

[22] Filed: Aug. 20, 1982

[30] Foreign Application Priority Data

Aug. 20, 1981 [JP] Japan .................. 56-131993

[51] Int. Cl.³ .................. H02J 3/18; G05F 1/68
[52] U.S. Cl. .................. 323/210
[58] Field of Search .................. 323/208–211; 307/98–99

[56] References Cited

U.S. PATENT DOCUMENTS 4,275,346 6/1981 Kelley, Jr. .................. 323/210
4,353,024 10/1982 Gyugyi .................. 323/210 X

FOREIGN PATENT DOCUMENTS 0050860 4/1979 Japan .................. 323/210

Primary Examiner—Peter S. Wong
Attorney, Agent, or Firm—Sughrue, Mion, Zinn, Macpeak, and Seas

[57] ABSTRACT

A method of static reactive power compensation is disclosed wherein the system voltage is compensated by supplying advanced-phase or retarded phase reactive power in dependence upon the difference between the system voltage and a reference voltage. The difference is formed by a comparator which receives a variable reference voltage from a filter containing a time lag circuit and which receives the system voltage as an input. For transients, the output of the filter does not change and thus reactive power is applied. For smooth variations, the output of the filter follows that of the system voltage so that the output of the power compensation circuit is maintained at zero.

6 Claims, 8 Drawing Figures

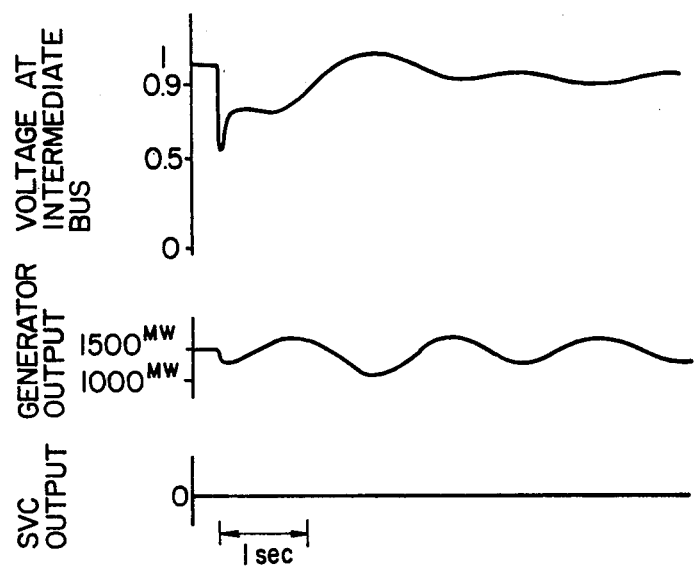
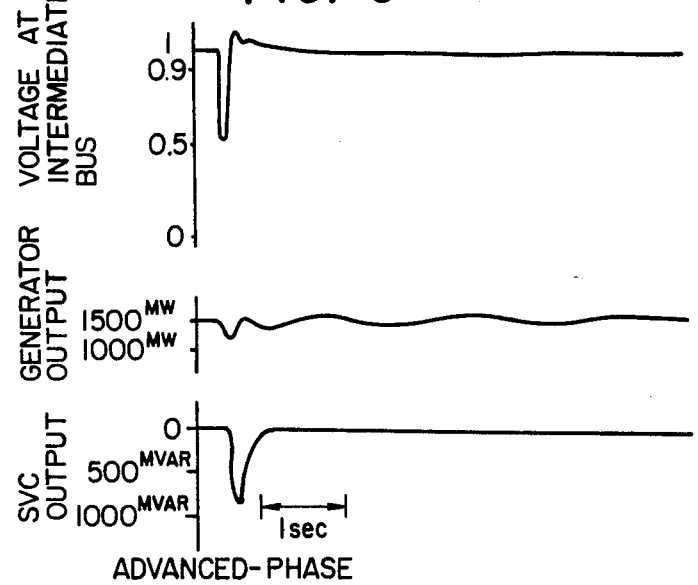

METHOD OF STATIC REACTIVE POWER COMPENSATION

BACKGROUND OF THE INVENTION

The present invention relates to a method of static reactive power compensation for maintaining the system voltage of a power supply system.

A conventional apparatus for effecting a method of the type described is shown is FIG. 1. Designated at 1 is an infinite bus; 2, a booster transformer; 3, a power transmission line (which may for example be a single-circuit 200 km, 500 kV transmission line); 4, a generator (which may for example be a generator having a total capacity of 2,500 MW); 5, 9 booster transformer; 6, a feeder high-tension bus (at 500 kV, for example); 7, an intermediate bus (at 500 kV, for example); 8 and 9, two-circuit power transmission lines (which may for example be 100 km, 500 kV lines); 10, a fault point in the power transmission line 9, and 11, 12, transmission line circuit breakers. A static reactive power compensator (hereinafter referred to as an "SVC", which is short for 'static var compensator') comprises a voltage-reading transformer 14, a capacitor 15 for supplying advanced-phase reactive power, a reactor 16 for supplying lagged-phase reactive power, and 17 is a thyristor switch for changing the current flowing through the reactor 16.

The SVC 13 further includes a transformer 18 for detecting the voltage at the intermediate point, a voltage detector circuit 19 for rectifying the output signal from the transformer 18 into an analog signal, a comparator circuit 21 for comparing the analog signal from the voltage detector circuit 19 with a reference voltage signal 20, a voltage control compensator circuit 22 for stabilizing the voltage control operation within the SVC 13, and an ignition circuit 23 for supplying trigger signals to the thyristor switch 17.

The operation of the apparatus thus constructed will now be described. The SVS 13 is connected to the intermediate bus 7 for supplying advanced-phase or lagged-phase reactive power to the power transmission lines to maintain the voltage at the intermediate bus, thus improving the stability of the power supply system under varying conditions. Assuming that the capacitor 15 has a capacity of 1,000 MVAR and the reactor 16 and the thyristor switch 17 have a capacity of 2,000 MVAR, the reactor 16 is rendered variable in capacity in the range of from 0 to 2,000 MVAR so that the SVC 13 can supply reactive power which is continuously variable from 1,000 MVAR with an advanced phase to 1,000 MVAR with a phase lag.

The transformer 18 serves to detect the voltage at the intermediate bus 7. When the voltage at the intermediate bus 7 is lower than the reference voltage signal 20, the SVC 13 supplies advanced-phase reactive power. When the voltage at the intermediate bus 7 is higher than the reference voltage signal 20, the SVC supplies lagged-phase reactive power to maintain the intermediate bus voltage at the reference voltage.

FIGS. 2 and 3 are illustrative in more detail of such voltage control operation.

In FIG. 2, the reactor 16 is cut off by the thyristor switch 17 with only the capacitor 15 connected in an interval from 0 to A, in which the advanced-phase reactive current varies in proportion to the voltage at the intermediate bus 7. During an interval from A to B, a constant-voltage characteristic is maintained under the control of the thyristor 17. The thyristor switch 17 is fully closed in the interval from B to C, during which the lagged-phase reactive current varies with the voltage. The slope of the line A—B is determined by the relationship between a signal indicative of the deviation of the reference voltage signal from the intermediate bus voltage and the signal supplied to the ignition circuit 23, that is, the control gain K of the voltage control compensator circuit 22. The slope is normally selected to allow the reactive power to vary from 0 to 1,000 MVAR with a voltage fluctuation ranging from 3 to 5%.

FIG. 3 shows a simplified relationship between the power supply system and the SVC. As viewed from the intermediate bus 7 to which the SVC 13 is connected, the power supply system can be regarded as a voltage source 30 having an impedance 31 ($L_v$), the voltage source 30 and its impedance 31 being variable from time to time.

When the voltage of the voltage source 30 is $V_{01}$ which is equal to the reference value, the operation of the SVC is at a point a in FIG. 2, whereupon the SVC produces an output of zero. When the voltage of the voltage source 30 drops to $V_{02}$, the SVC supplies advanced-phase reactive power, and the intermediate bus voltage increases along a slope dependent upon the impedance 31, namely, the curve 2, so that the operating point of the SVC is shifted to point b, with the voltage at the intermediate bus 7 being maintained in the vicinity of $V_{01}$. When the voltage of the voltage source 30 is further reduced to $V_{03}$, the power supply voltage characteristic is governed by the curve 3, so that the operating point of the SVC drops to the point c, which is below the point A. At point c, the reactor 16 is completely open and the capacitor 15 is connected in the circuit, but the SVC 13 is incapable of maintaining a constant voltage. Therefore, the voltage at the intermediate bus 7 undergoes a fluctuation which is substantially the same as the voltage drop from $V_{02}$ to $V_{03}$.

The stability of the electric power in a power supply system reaches its limit when the phase angle between the voltages at the sending end and the receiving end is 90 degrees. With long-distance power transmission, the phase angle is 30 to 40 degrees, at the most, with an internal impedance of the generator being removed. Where the SVC is installed to maintain the intermediate bus voltage, the phase angle between the voltages at the sending end and the intermediate bus, and the phase angle between the voltages at the intermediate bus and the receiving end are 90 degrees, respectively, at the most, and hence the phase angle between the sending and receiving ends can be around or greater than 90 degrees to thereby increase the maximum electric power that can be transmitted.

By maintaining the intermediate bus voltage using the SVC, the stability in the transient state can be improved as follows: FIG. 4 is illustrative of the operation of an unstable power supply system similar to that shown in FIG. 1, but having no SVC, and FIG. 5 shows operation of a stable power supply system with an SVC installed at the intermediate bus. FIGS. 4 and 5 show waveforms recorded of system fluctuations produced when the circuit breakers 11, 12 are opened four cycles after a three-wire ground fault has occurred at the intermediate point 10 in the transmission line 9. A study of FIG. 4 indicates that when the faulty transmission line is severed by the circuit breakers 11, 12, the voltage at the intermediate bus does not return quickly to a steady voltage value as the voltage drop across the transmission line is increased. Therefore, the electric power supplied by the generator 4 to the power supply system is reduced. Since the mechanical input to the generator 4 does not change rapidly, however, an accelerating force acts on the rotor of the generator to progressively increase the phase angle of the generator 4. When the phase angle is excessively advanced, the electric power supplied from the generator 4 to the power supply system is increased to the point where it exceeds the mechanical input to the generator 4. The phase angle of the generator 4 begins to be reduced, and the output electric power from the generator 4 begins to be reduced about 1 second after the fault has occurred. The phase angle of the generator 4 is thus caused to fluctuate with a period of on the order of 2 seconds. In this condition, the system may exceed stability limits and be thrown into an unstable condition in which the generator 4 is subjected to step-out.

In FIG. 5, when the voltage drops due to the three-wire ground fault, the SVC 13 supplies the system with advanced-phase reactive power at about 800 MVAR to maintain the intermediate bus voltage at a substantially steady voltage level. The electric power supplied from the generator 4 to the system is kept at a constant level without being reduced, so that no accelerating force acts on the rotor of the generator 4 and hence the phase angle thereof will not be increased or reduced. Accordingly, fluctuations in the power supply system can be held to a minimum. The SVC thus serves to improve the stability of the system under transient conditions.

When the SVC operates at point b in FIG. 2, the SVC has already supplied the system with advanced-phase reactive power approximating the maximum capacity. Even when the system undergoes a ground fault, the SVC's capability to maintain the voltage of the system may be exceeded, and the voltage at the intermediate bus 7 drops to the point c, with the result that the system oscillates and becomes unstable. Since the voltage at the intermediate bus 7 in the steady state varies from time to time with the voltage of the generator 4, the condition of the transmission lines, and the electric power transmitted, the above difficulty can arise when the reference voltage value is set at the constant level $V_{01}$.

With the conventional SVC thus arranged, when a transmission line suffers a ground fault while electric power is transmitted with the intermediate bus voltage being at a level lower than a reference voltage, the SVC cannot maintain the voltage, and the generator undergoes step-out.

Recently, a further static compensation system has become known, as described in "Control of Shunt Compensation-Viewpoint Two" by Romegialli et. al., presented at the London IEE seminar, September 1980. Both fixed capacitor and thyristor switched capacitor systems are analyzed therein, and a control system is proposed wherein the VAR production of the SVS is controlled by correcting the voltage set point. The reactive power is compared with range limits and switching signals, which may be suitably delayed, are accordingly output. However, this system requires a VAR transducer for giving a value indication to the VAR regulator, and other components leading to an overly complex control function. In the present invention, advantageous effects can be derived from the use of a simple delay filter device, largely simplifying the apparatus performing the control function.

SUMMARY OF THE INVENTION

The present invention has been made in an effort to eliminate the conventional problems presented above. It is an object of the present invention to provide a method of eliminating the output of the SVC in a steady state, yet rotaining the voltage maintaining capability of the SVC in a transient state, by selecting the reference voltage value to be the system voltage in certain instances.

BRIEF DESCRIPTION OF THE DRAWINGS

FIG. 4 is graph showing the operating characteristics of an unstable system having no static reactive power compensator;

FIG. 5 is a graph showing the operating characteristics of a stable system having a static reactive power compensator;

DETAILED DESCRIPTION OF THE PREFERRED EMBODIMENTS

Figure 6:
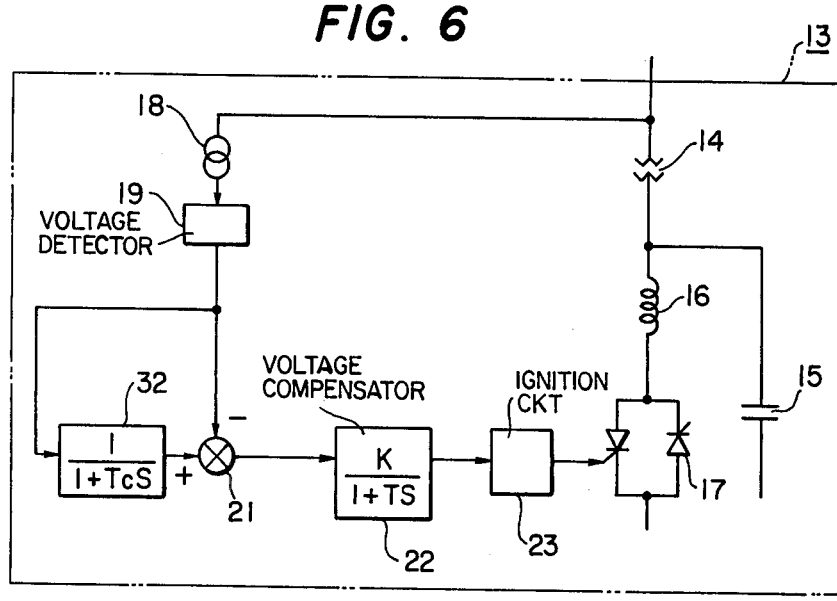
FIG. 6 is a circuit diagram of a static reactive power compensator according to an embodiment of the present invention.

One embodiment of the present invention will now be described with reference to FIG. 6. Like or corresponding parts shown in FIG. 6 are denoted by like or corresponding reference characters in FIG. 1. Components 1 through 12 are the same as those similarly designated in FIG. 1, and hence will not be described. The arrangement shown in FIG. 6 differs from the conventional arrangement in that it includes a parallel filter 32 composed of a circuit of a first order time lag having a time constant on the order of about 10 seconds. Due to the time constant of the parallel filter 32, its output will not fluctuate when the voltage suffers from fluctuations of about 1 second duration, which causes the fluctuation problems in the power supply system. Thus, in this case, the parallel filter 32 can be regarded as if absent from the circuit, and the SVC will operate to improve the stability in the transient state. When the voltage at the intermediate bus 7 drops at a slow, steady rate dependent on the conditions of the power supply system, the output from the parallel filter 32 will cancel out the output of the voltage detector circuit 19. This indicates to the SVC that the voltage at the intermediate bus 7 does not drop, and the reactive power produced by the SVC thus falls to zero. With such an arrangement, when the voltage of the power supply system fluctuates steadily for 10 seconds or longer, the voltage of the power supply system will serve as a reference voltage value for the SVC 13.

More specifically, when the system is stable, inputs + and − to the comparator circuit 21 are made equal to each other, and the output of the comparator circuit 21 is thus zero. When the voltage fluctuates rapidly, the output of the parallel filter 32 does not fluctuate, so the fluctuation is produced as an output of the comparator. With a slow voltage fluctuation, the output from the parallel filter 32 undergoes a like fluctuation, and the comparator output falls to zero.

Figure 7:
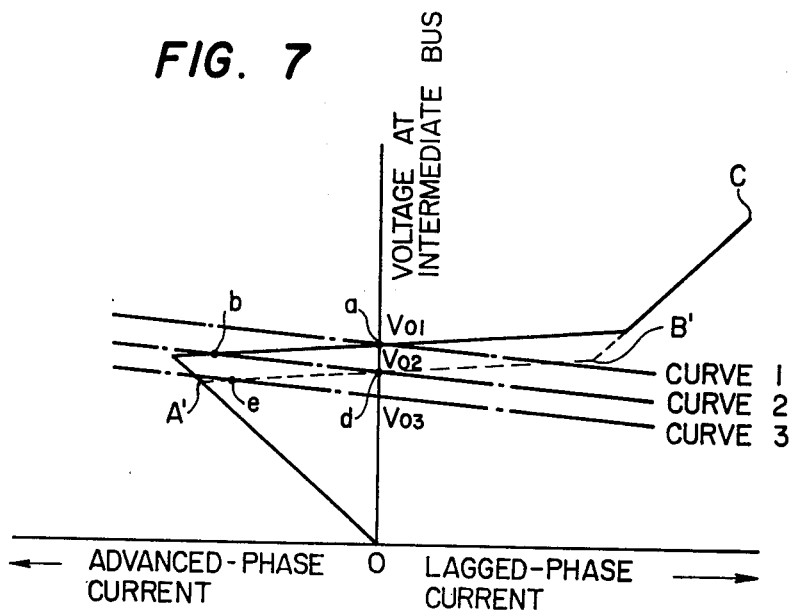
FIG. 7 is a graph illustrative of the characteristics of the static reactive power compensator of the present invention.

FIG. 7 is further illustrative of the operation of the present invention. When the voltage at the intermediate bus 7 is $V_{01}$, which is equal to the reference voltage level, the SVC operates at point a, and the output of the SVC is zero. When the voltage of the voltage source 30 drops to $V_{02}$, the operating point shifts to point b, and the SVC supplies advanced-phase reactive power. While the voltage of the voltage source 30 is maintained at $V_{02}$ for 10 seconds or more, the output signal from the parallel filter 32 is rendered effective to cancel the voltage feedback signal, so that the SVC has its operating point shifted to point d and produces an output of zero. For a rapid voltage fluctuation, therefore, the SVC has a characteristic represented by the curves O–A'–B'–C. When the voltage of the voltage source 30 is reduced to $V_{03}$ due to a ground fault in the system, the operating point of the SVC shifts to a point e and the voltage at the intermediate bus 7 is maintained substantially at $V_{02}$. The SVC is thus effective to improve system stability in the transient state as it functions to maintain the voltage in the event of a rapid voltage fluctuation in the system.

Figure 1:
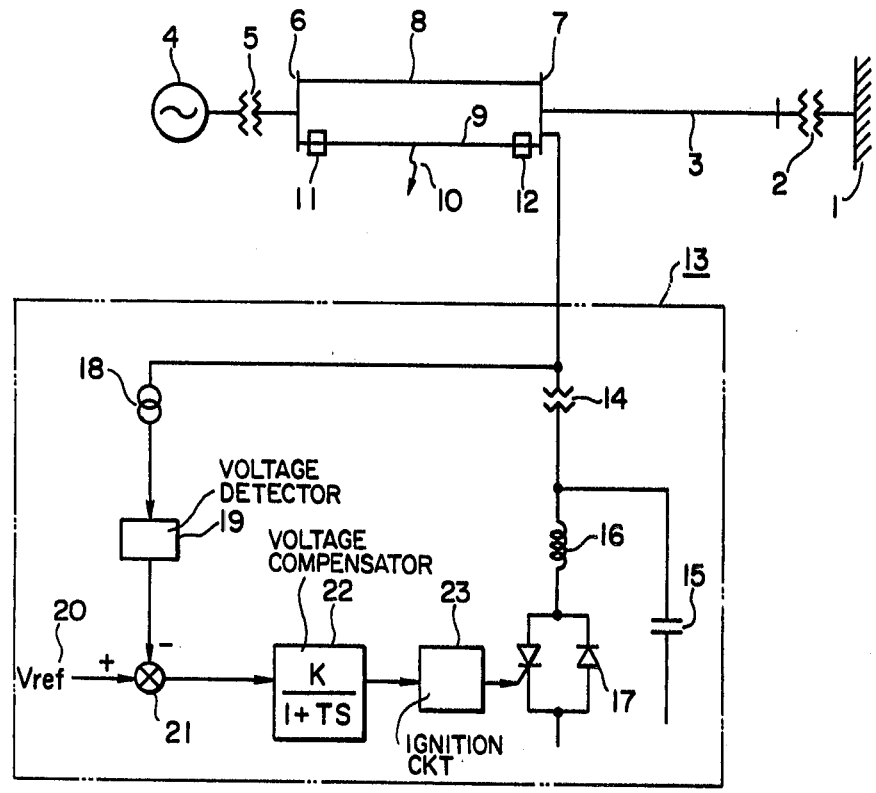
FIG. 1 is a circuit diagram of a conventional static reactive power compensator.
Figure 3:
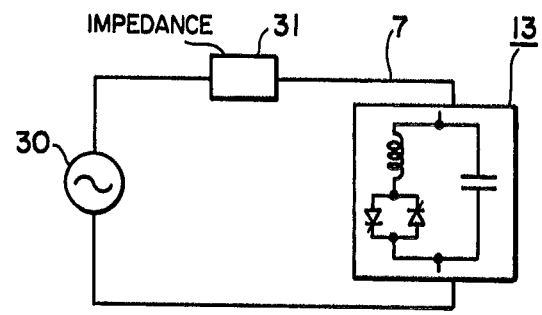
FIGS. 2 and 3 are graphs showing the operating characteristics of the conventional static reactive power compensator.
Figure 2:
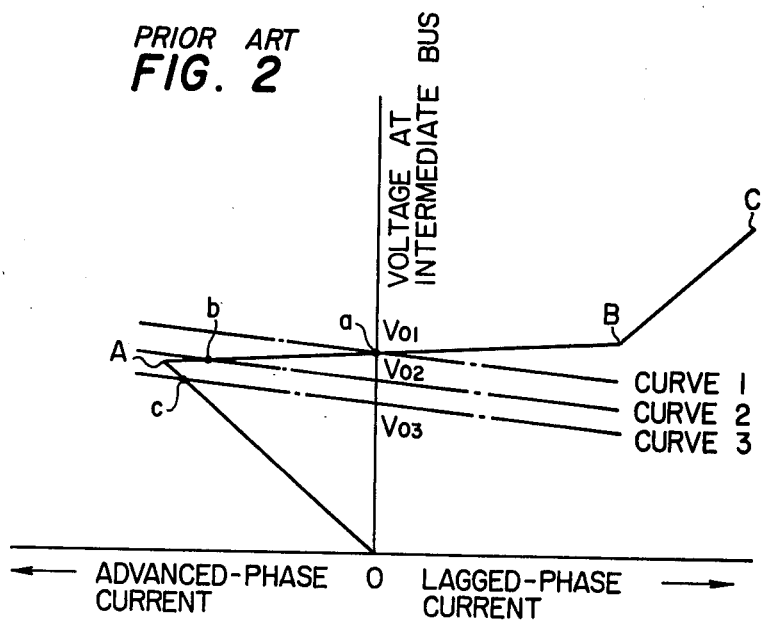

If the conventional arrangement shown in FIG. 1 were employed to obtain the same results as those achieved by the present invention, an SVC would be required which could compensate for voltage fluctuations from $V_{01}$ to $V_{03}$, and hence would necessarily be of a capacity several times greater than that of the SVC of the invention.

Figure 8:
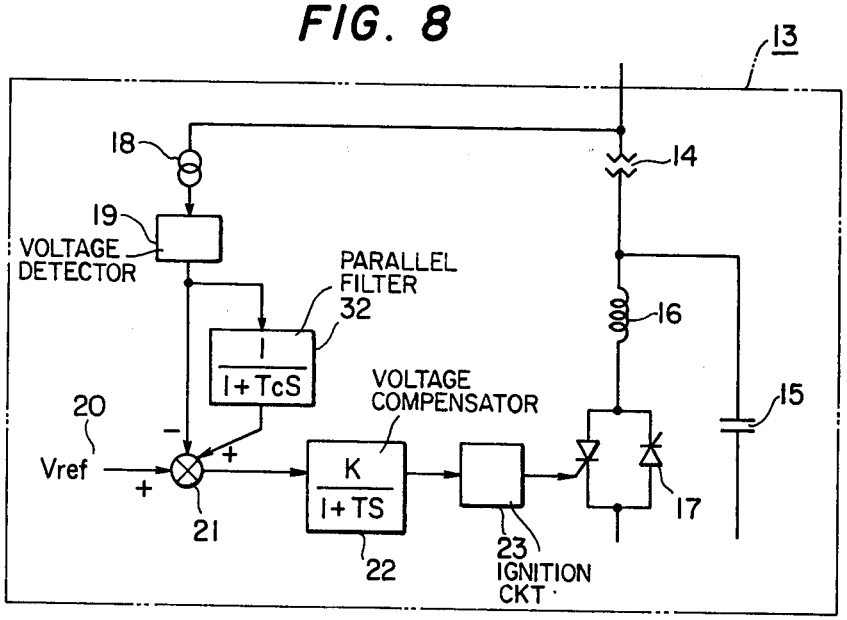
FIG. 8 is a circuit diagram of a static reactive power compensator according to another embodiment of the invention.

FIG. 8 shows another embodiment of the present invention, in which a parallel filter 32 is added to the conventional structure shown in FIG. 1. With this arrangement, a base voltage can be added for the controlling operation to a reference voltage value by using a reference voltage signal Vref. Where such control is not needed, the reference voltage signal Vref may be kept at zero.

The system voltage may be counted by a digital counter so as to serve as a reference voltage value. Alternatively, an analog integrating circuit may be employed to produce the reference voltage value.

With the present invention, as described above, a method of static reactive power compensation for maintaining the system voltage utilizes the system voltage within a certain interval of time as a reference voltage value, and requires a static reactive power compensator of relatively smaller capacity for maintaining the system voltage.

What is claimed is:

1. A method of static reactive power compensation, comprising; supplying advanced-phase reactive power or lagged- phase reactive power in dependence on the difference between a system voltage and a reference voltage value; and varying said reference voltage value such that said value represents the system voltage within a desired interval of time, such that, in a steady state, said difference falls to zero to eliminate said reactive power, and such that, in a transient state, said difference is fed as an output to cause the supply of said reactive power for maintaining the system voltage.

2. A method according to claim 1, wherein said reference voltage value is obtained by applying the system voltage through a filter.

3. A method according to claim 2, wherein said filter comprises a circuit having a first order time lag.

4. A method according to claim 3, wherein said circuit has a time constant of about 10 seconds.

5. A method according to claim 1, wherein said advanced-phase reactive power is supplied by a capacitor, and said lagged-phase reactive power is supplied by a reactor connected to a thyristor switch supplied with an ignition signal based on the deviation of said reference voltage value from the system voltage.

6. A method according to claim 1, wherein said reference voltage value is obtained by passing an output from a voltage detector circuit for detecting the system voltage through a filter, and a deviation of said reference voltage value from said system voltage is obtained by a comparator circuit with the output from said voltage detector circuit being supplied as an input to be compared.

* * * * *